May 12, 1925.

M. H. MULKIN 1,537,652

MANURE LOADING MACHINE

Filed Nov. 28, 1919

INVENTOR
Morris H. Mulkin
BY
Parsons & Bodell
ATTORNEYS

May 12, 1925.

M. H. MULKIN

MANURE LOADING MACHINE

Filed Nov. 28, 1919

INVENTOR
Morris H. Mulkin
BY
Rasmus Bodell
ATTORNEYS.

May 12, 1925.

M. H. MULKIN

MANURE LOADING MACHINE

Filed Nov. 28, 1919

INVENTOR.
Morris H. Mulkin
BY Parsons & Bodell
ATTORNEYS.

May 12, 1925.

M. H. MULKIN

MANURE LOADING MACHINE

Filed Nov. 28, 1919

INVENTOR.
Morris H. Mulkin
BY
Parsons & Bodell
ATTORNEYS.

May 12, 1925.

M. H. MULKIN

MANURE LOADING MACHINE

Filed Nov. 28, 1919

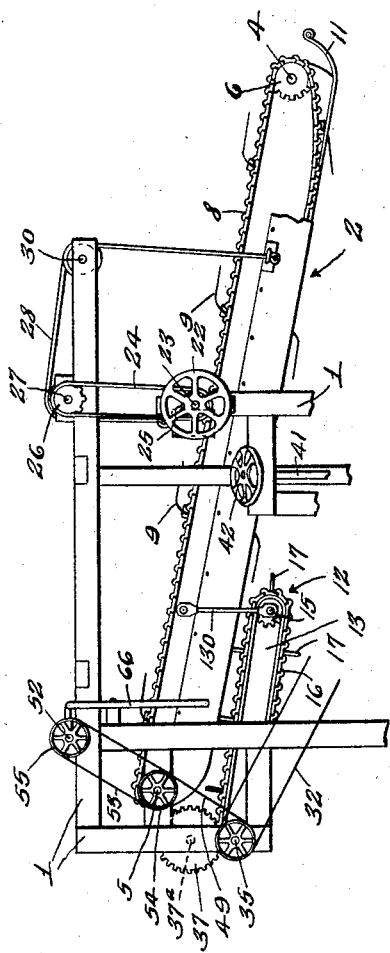

Patented May 12, 1925.

1,537,652

UNITED STATES PATENT OFFICE.

MORRIS H. MULKIN, OF SYRACUSE, NEW YORK.

MANURE-LOADING MACHINE.

Application filed November 28, 1919. Serial No. 341,123.

*To all whom it may concern:*

Be it known that I, MORRIS H. MULKIN, a citizen of the United States, and a resident of Syracuse, in the county of Onondaga and State of New York, have invented a certain new and useful Manure-Loading Machine, of which the following is a specification.

This invention has for its object a loading machine applicable for loading or conveying manure from piles into wagons or other receptacles which machine is particularly simple in construction, readily operable and highly efficient and durable in use.

It consists in the novel features and in the combinations and constructions hereinafter set forth and claimed.

Figure 7 is a detail view of the clutch for controlling the movement of the frame along the track.

Figure 8 is a view similar to Figure 1, showing the loading carriers in inclined position.

Figure 1:
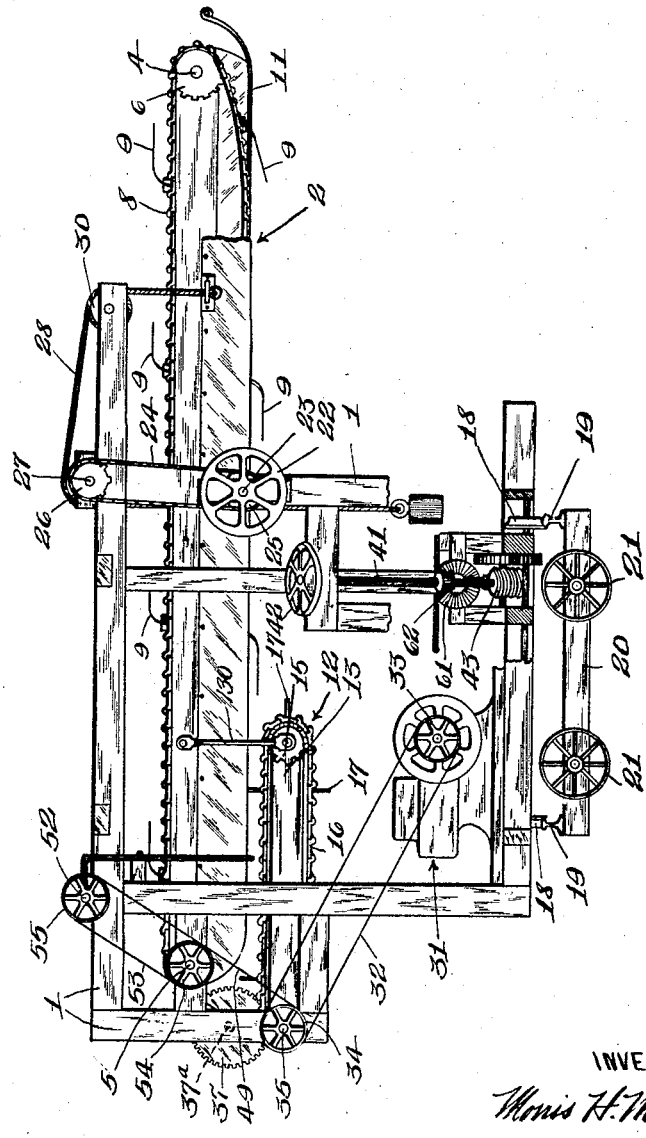
Figure 1 is an end elevation of a machine embodying my invention.

This loading machine comprises generally, a frame, a carrier supported by the frame in horizontal position and including an endless conveyor belt having teeth or forks projecting therethrough at intervals, a second carrier including an endless conveyor belt overlying the one end portion of the former conveyor so that one run or side of one conveyor belt is opposed to a run or side of the other conveyor, the second mentioned conveyor belt having teeth extending into the path of the teeth of the first mentioned conveyor, means for actuating the conveyors in opposite directions whereby their opposing sides or runs travel in the same direction.

The machine further includes supporting wheels for the frame thereof which wheels are adapted to run along tracks and means for operating the wheels by hand or by power.

1 designates the frame which may be of any suitable form, size and construction.

2 is a receiving carrier which includes a suitable frame or guide 3 at opposite ends of which are supported shafts 4, 5 having sprocket wheels 6, 7 thereon and endless conveyor chain belts 8 running over the sprocket 6, 7 and having projecting forks or teeth 9 at intervals, these teeth having their end portions extending or pointing in the direction of movement of the conveyor 8.

These forks 9 are here shown as mounted on cross bars 10 carried by links of the chain or conveyor 8, the cross bars having rollers at their ends which engage when on the under run of the conveyor chain, tracks or inturned flanges 11 depending from the frame 3.

12 is a carrier which for convenience might be called a delivery conveyor, this conveyor also including a suitable guide or support 13 carrying sprocket wheels 14, 15 around which the conveyor belts or chains move, the conveyor belts or chains 16 supporting cross bars having outwardly extending teeth 17 arranged at a right angle thereto and movable in the path of the teeth or forks 9 on the opposing run of the conveyor chain 8.

The carrier 12 is arranged under one end as the left hand end or discharge end of the conveyor 2, Fig. 1, and has one end, that is, the left hand end, extending beyond the contiguous end of the conveyor 2. The lower run of the conveyor 2 and the upper run of the carrier 12, travel in the same direction, that is, to the left or in the same direction that the forks 9 project on the lower run of the conveyor 2, and hence the conveyor 12 operates to pull or wipe the bunches of materials from the forks 9, and deliver them to wagon or other receptacle, extending under the left hand end of the carrier 12.

18 are supporting wheels for the frame 1, these wheels being here shown as flanged wheels adapted to run along rails 19.

The rails are shown as supported on ties 20 supported by wheels 21 by means of which the tracks can be shifted laterally.

The carrier 2 is movable about the axis of the shaft 5 in order to lift and lower the receiving end of the conveyor and the carrier is raised and lowered by means of a hand wheel 22 mounted on a shaft 23 carried by the frame, a belt or chain 24 movable over wheels 25, 26 on the shaft 23 and on a shaft 27 supported on the upper end of the frame, cables 28 winding on a drum 29 on the shaft 27 and running around pulleys 30 supported by the frame and then downwardly to the frame 3 of the carrier.

As the wheel 22 is turned in one direction or the other, the cables 28 will be wound or unwound and hence raise or lower the receiving end of the carrier to conform to the height of the pile from which the manure is being loaded.

The carrier 12 is movable about a shaft 35 with the carrier 2, when the latter moves about the axis of the shaft 5, the free end of the carrier 12 being connected to the carrier 2 by a link 130.

The carrier belts 8 and 16 move in opposite directions and the belt 16 moves at a greater speed than the conveyor chain 8 and these conveyors are actuated from the motor carried by the frame 1 and power transmitting means actuated by the motor.

31 designates the motor which is connected to the carrier chain 16 by means of a belt 32 running over a pulley 33 on the crank shaft of the motor and over a pulley 34 mounted on the shaft 35 on which are also mounted the sprocket wheels 14 at one end of the conveyor belt 16.

Figure 4:
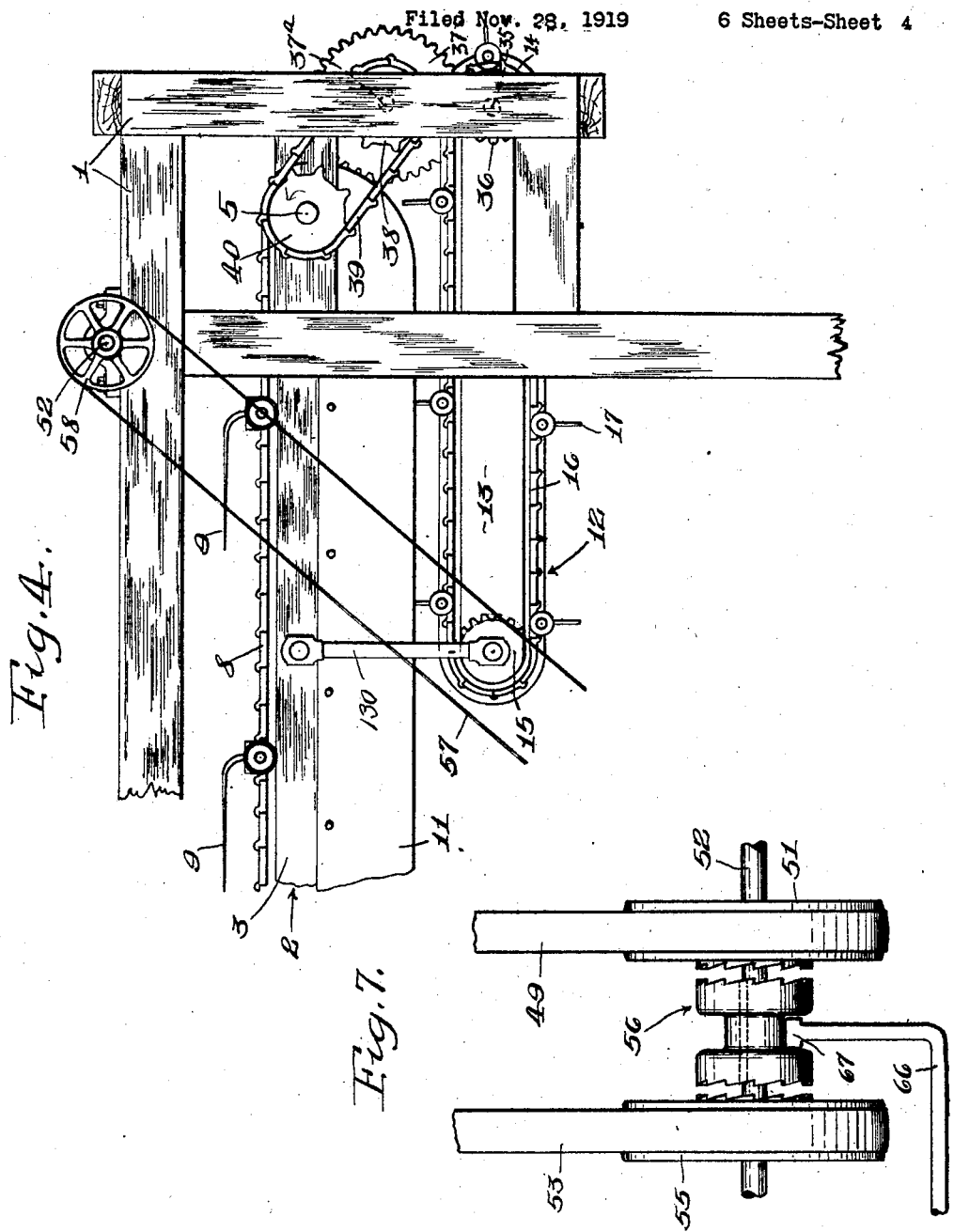
Figure 4 is a fragmentary detail view of one of the carriers and contiguous part of the frame showing a portion of the means for operating the carriage.

The conveyor belt 8 is actuated from the shaft 35 by means of a gear 36 mounted on and near the ends of the shaft 35, Figs. 1 and 4, and meshing with an intermediary gear 37 mounted on a suitable shaft 37ª supported by the frame, sprocket wheel 38 mounted on said shaft and a sprocket chain 39 running over the wheel 38 and around the sprocket wheel 40 mounted on the shaft 5 on which are also mounted the sprocket wheels around which one end of the conveyor chain 8 runs.

Owing to the intermediary gear 37 the conveyor belt 8 runs in the opposite direction from the conveyor belt 16 and the opposing runs of these belts travel in the same direction.

Figure 5:
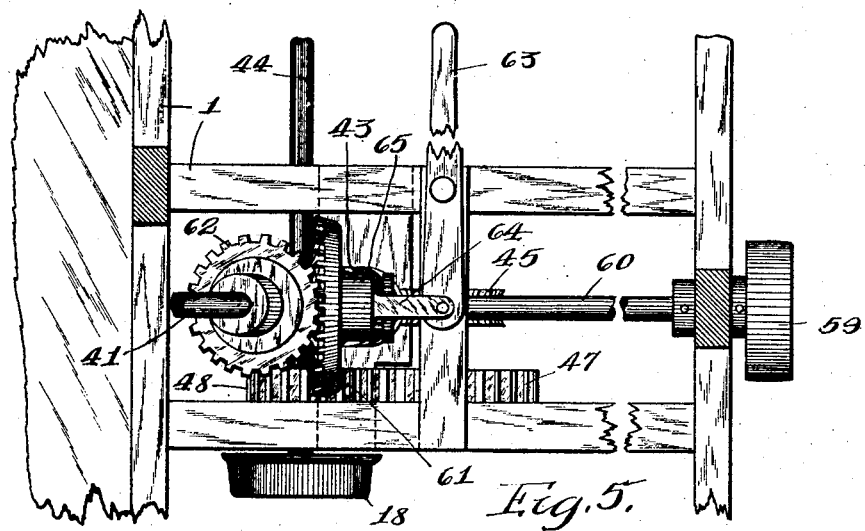
Figures 5 and 6 are respectively a plan view and a side elevation of mechanism for driving the loading machine along tracks contiguous portions of the frame being also shown.
Figure 6:
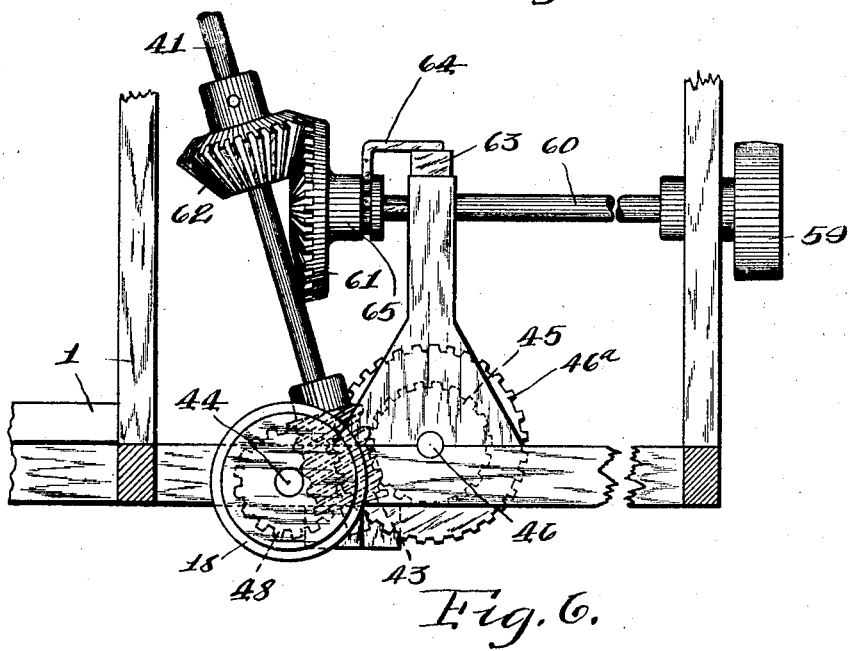

The frame may be moved along the track 19 by hand or by power. It is moved by hand in any suitable manner as by a shaft 41, see Figs. 1, 5 and 6 arranged in an inclined position on the frame and having a hand wheel 42 at its upper end and a worm 43 at its lower end which drives the axle 44 for the supporting wheels 18 through reducing gearing including worm gear 45 mounted on a shaft 46 supported by the frame and meshing with the worm 43, a gear 47 also mounted on a shaft 46 and meshing with a gear 48 on the axle for the wheels 18.

Obviously, by turning the hand wheel 42 the wheels 18 will be actuated to move the frame in one direction or the other along the track 19.

Figure 2:
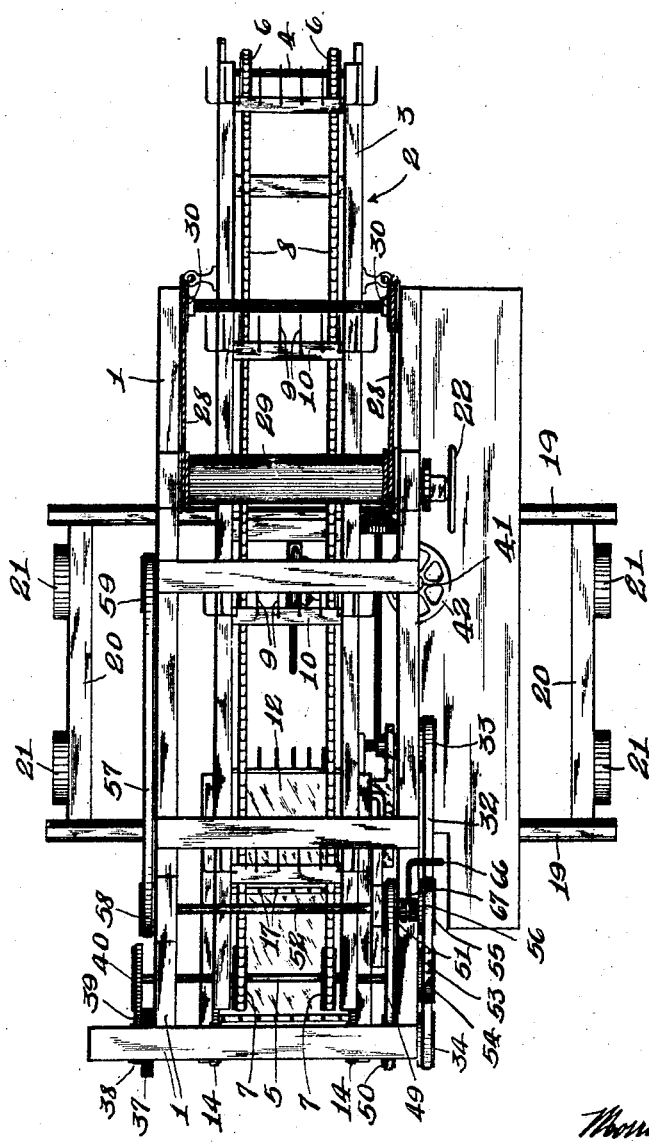
Figure 2 is a plan view thereof.
Figure 3:
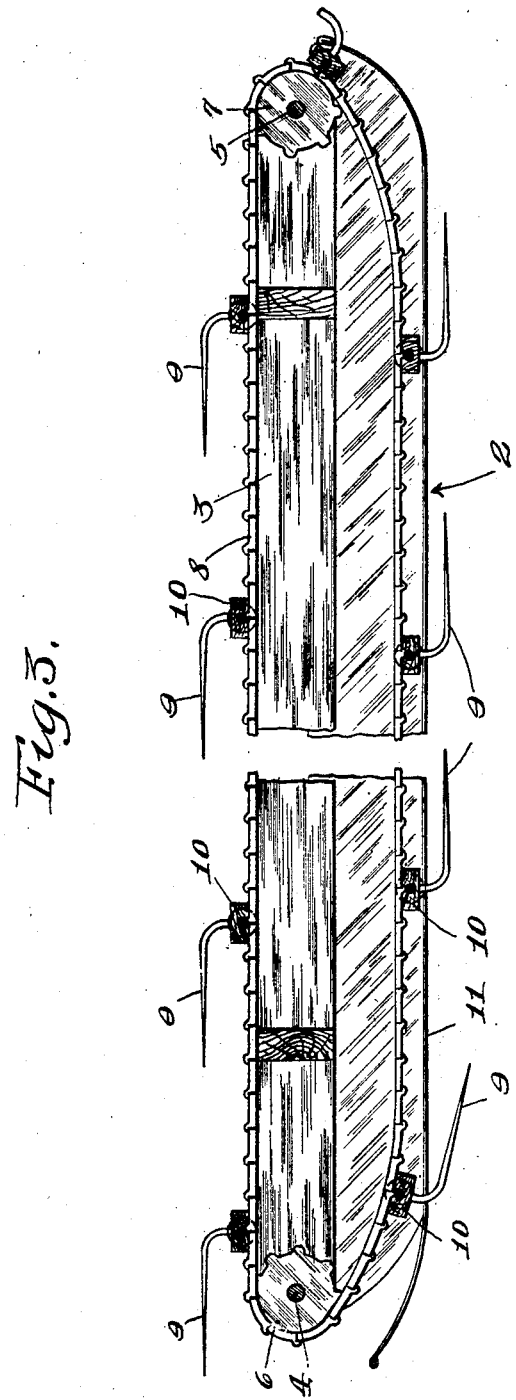
Figure 3 is a detail longitudinal sectional view of one of the carriers.

When it is necessary to move the frame a considerable distance, means is provided for connecting the shaft 41 so that it is driven from the motor 31. These connections include a belt 49, Figs. 1 and 2, running over a pulley 50 on the shaft 34 and over a pulley 51 loosely mounted on a shaft 52 mounted on the top of the frame, a belt 53 running over pulley 54 on the shaft 5 and a pulley 55 loosely mounted on the shaft 52, means as a shiftable clutch 56 for connecting either loose pulley 51 or 55 to the shaft 52, a belt 57 movable over a pulley 58 also mounted on the shaft 52 and over a pulley 59 mounted on a shaft 60 located at the bottom of the frame and having a gear wheel 61 thereon meshing with the gear wheel 62 on the hand operated shaft 41, the gear 61 being shiftable axially on the shaft 60 in any suitable manner as by a hand lever 63 which operates a suitable shifting fork 64 coacting with the hub 65 of the gear 61. The clutch 56 is shiftable from neutral position axially on the shaft 52 to which it is keyed to carry its clutch faces into engagement with similar clutch faces on the hubs of the loose pulleys 51, 55 by means of a suitable shifting lever 66 which operates a fork 67 coacting with the clutch 56.

The machine with the carrier 2 projecting laterally therefrom as shown in Fig. 1, travels endwise along the tracks 19, with the right hand end of the carrier 2 projecting into the pile of material to be loaded, and as the tracks 19 are mounted on trucks, the machine can be shifted toward and from the pile in order to place the right hand end of the carrier 2 in position to engage the pile. During the movement of the belt 8 of the carrier 2, the forks 9 passing downwardly around the shaft 4 hook into the material of the pile and pick up such material in bunches and convey it to the right to the carrier 12, which in turn conveys it to the wagon or other vehicle at the left hand end of the machine, Fig. 1, the carrier 12 wiping or pushing the bunches off the forks 9.

What I claim is:

In a loading machine, a main frame, a conveyor having an endless belt and comprising a frame pivoted to the main frame and extending in a general horizontal direction and being movable about its pivot into different inclinations out of the horizontal, a second conveyor extending under the pivoted end of the first conveyor comprising a frame pivoted to the main frame, the frame of the second conveyor being connected to the frame of the first conveyor to move in parallelism therewith during pivotal movement of the first conveyor, means for elevating and lowering the free end of the first conveyor, and means for actuating the conveyors whereby their opposing sides run in the same direction, substantially as and for the purpose described.

In testimony whereof, I have hereunto signed my name, at Syracuse, in the county of Onondaga, and State of New York, this 5th day of June, 1919.

MORRIS H. MULKIN.